United States Patent [19]

Rubino et al.

[11] 3,860,705

[45] Jan. 14, 1975

[54] ANTIMICROBIAL COMPOSITIONS CONTAINING ALUMINUM HALIDE COMPOUNDS

[75] Inventors: Andrew M. Rubino, New Providence; William S. Gilman, South Plainfield; John L. Jones, North Plainfield, all of

[73] Assignee: Armour Pharmaceutical Company, Phoenix, Ariz.

[22] Filed: Nov. 8, 1971

[21] Appl. No.: 196,751

[52] U.S. Cl. .............. 424/157, 424/154, 424/340, 424/347
[51] Int. Cl. ................... A01n 13/00, A61k 27/00
[58] Field of Search ............ 424/157, 154, 340, 347

[56] References Cited
UNITED STATES PATENTS
3,177,115   4/1965   Casely et al. ..................... 424/322

OTHER PUBLICATIONS

U.S. Dispensatory–25th edit. 1955, page 56.

*Primary Examiner*—Sam Rosen
*Attorney, Agent, or Firm*—Frank T. Barber; Carl C. Batz

[57] ABSTRACT

Antimicrobial compositions in which an inorganic moiety constitutes the major portion of the composition are produced by combining an aluminum halide compound with minor quantities of polyhalocarbanilide and another bactericidal agent selected from the group consisting of halogenated bisphenols and 2,2,4'-trichloro-2'-hydroxydiphenyl ether. The resulting germicidal compositions exhibit synergistic antimicrobial effects against bacteria and fungi.

16 Claims, No Drawings

ANTIMICROBIAL COMPOSITIONS CONTAINING ALUMINUM HALIDE COMPOUNDS

The present invention relates to germicidal compositions exhibiting synergistic antimicrobial effects against bacteria and fungi. More particularly, it relates to the production and use of a novel tri-component composition of matter consisting essentially of (i) an aluminum halide compound, (ii) a polyhalocarbanilide and (iii) a bactericidal agent selected from the group consisting of halogenated bisphenols and 2,4,4'-trichloro-2'-hydroxydiphenyl ether. It has now been found that this system exhibits a high degree of broad spectrum antimicrobial activity and furthermore, that it exhibits a synergistic effect against both bacteria and fungi. More specifically, it has been found that the antimicrobial effect derived from this tri-component system exceeds the sum of the antimicrobial effects derivable from each component taken individually.

Heretofore, each of the individual components of the novel tri-component system of the present invention has been recognized as having antimicrobial properties. In the case of basic aluminum halides, some low level bactericidal and bacteriostatic characteristics have been reported. The utilization of halogenated bisphenols in soaps and detergents and for deodorant purposes is well known along with its bactericidal activity against Gram-positive bacteria. The inherent limitations of halogenated bisphenolic compounds, such as high relative toxicity, photosensitivity, reactivity with heavy metal ions, and lack of antimicrobial activity against fungi and Gram-negative bacteria are also well known. In addition, the utilization of 2,4,4'-trichloro-2'-hydroxydiphenyl ether in topical preparations is well known. However, it has not been shown to be economically competitive with other similar antimicrobial compositions. Halogenated carbanilides are also deficient in their properties or abilities to combat Gram-negative bacteria and fungi at realistic concentrations.

U.S. Pat. No. 3,177,155 discloses a synergistic combination consisting essentially of a halogenated bisphenolic compound mixed with trichlorocarbanilide (TCC) in which the relative range of components is described as 9 to 1 parts by weight of TCC to 9 to 1 parts by weight of the halogenated bisphenolic compound (such as hexachlorophene). Many of the described difficulties associated with the individual constituents as discussed above, have been corrected by the combination set forth in U.S. Pat. No. 3,177,155. However, the combination does not exhibit sufficient activity against fungi and the inherent photo-sensitivity, toxicity and reactivity with heavy metal ions which are associated as impurities in dermatological formulation ingredients, continue to be a problem.

Accordingly, it is an object of the present invention to provide new antimicrobial compositions which exhibit broad spectrum antimicrobial activity against Gram-negative and Gram-positive bacteria, resident skin bacteria, dermatophytes, yeasts, and various fungi.

Another object of the present invention is to provide new antimicrobial compositions in which the concentration of the antimicrobial agent, such as a halogenated bisphenol or 2,4,4'-trichloro-2'-hydroxydiphenyl ether, is reduced substantially whereby the technical and economic limitations associated with their uses are also reduced substantially.

A further object of the present invention is to provide new antimicrobial compositions containing at least 70% by weight of the inorganic moiety (aluminum halide compound) whereby the inherent astringent and healing characteristics associated with this aluminum salt enhances the topical dermatological usage of the resultant composition.

It is a feature of the present invention that the novel antimicrobial compositions produced afford a topically employable dermatological ingredient for creams, lotions, ointments, powders and the like where germicidal activity is required along with astringency and healing characteristics. In addition, it has been found that the antimicrobial activities derivable from this novel composition exceed the antimicrobial components activity of several presently marketed topical products i.e. foot care deodorants, diaper rash, aftershave, minor first aid antiseptics, mouth washes, dandruff treatments, female personal care products, proctological products, and other topical systems, along with detergent, disinfectant, and fabric sanitization products. Thus, various usages become apparent by the obvious improvements derivable by incorporating the proposed system, instead of existing systems, into the above-mentioned products. Furthermore, since the inorganic moiety represents such a large portion of the system, nontopical applications such as in paints, glues, cements, mildewcide applications and as non-foaming microbicides for slime and sludge prevention in wet air cleaning systems are also comtemplated.

Broadly, the present invention provides an antimicrobial composition containing as its essential active ingredients, a synergistic combination of from 70 to 99.5% by weight of an aluminum halide compound, from 0.25 to 20% by weight of a bactericidal agent selected from the group consisting of halogenated bisphenols and 2,4,4'-trichloro-2'-hydroxydiphenyl ether, and from 0.25 to 20 weight percent of polyhalocarbanilide.

In accordance with the present invention, the aluminum halide compound is a coordinated complex of aluminum which can be represented by the general formula:

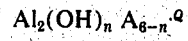

where $n$ is 0–5 and need not be an integer; where A is chlorine, bromine or iodine or a mixture thereof; and Q is water and/or a polyhydroxy compound having at least two carbon atoms, each of which is linked to a hydroxy group, and where the total amount of the free and coordinated constituent Q is in the range of from about 15 to 40 percent by weight of the total weight of the complex. Such compounds are referred to herein as hydrated aluminum halide complexes and hydrated or non-hydrated, alcoholated aluminum halide complexes.

BASIC ALUMINUM HALIDE COMPLEXES

As used herein, the term "aluminum halide complex" refers to compounds such as basic aluminum halides or normal aluminum halides having the general formula:

wherein: $0 \leq y < 6$ and need not be an integer, and X is a halide selected from the group consisting of chlorine, bromine and iodine and mixtures thereof. Basic aluminum halides contain varying quantities of basic units such as $Al_2(OH)_2X_4$, $Al_2(OH)_4X_2$ and $Al_2(OH)_5X$ and normal aluminum halides. However, because of the infinite number of combinations with $Al_2X_6$ up to precipitation of $Al_2(OH)_6$, $y$ in the above formula can vary in infinitely small values from 0 to 6. In addition, it should be understood that the above formula is greatly simplified and is intended to include basic aluminum halides containing coordinated or bound molecules of water as well as basic aluminum halide polymers, complexes and mixtures of the above.

Particularly suitable for the purposes of the present invention are basic aluminum halides having a basicity in the range of about one-third to five-sixths and the normal aluminum halide salts; that is, compounds of the above general formula having a predominance of units of $Al_2X_6$, $Al_2(OH)_2X_4$, $Al_2(OH)_4X_2$ and/or $Al_2(OH)_5X$ such that the aluminum to halide mol ratio ranges from about 0.5 to 3.0.

HYDRATED BASIC ALUMINUM HALIDE COMPLEXES

As is well known, basic aluminum halide complexes which are hydrated or partially hydrated are produced, for example, by adding aluminum metal to an aluminum halide or a hydrogen halide in water solution and partially drying the product to a solid form short of decomposition to $Al(OH)_3$ and/or $Al_2O_3$. Thus, the hydrated basic aluminum halide compounds used in the formation of the antimicrobial compositions of the present invention can be represented by the general formula:

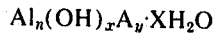

wherein: $n$, $x$ and $y$ are integers such that $x + y = 3n$; A is chlorine, bromine, iodine or mixtures thereof; and X is from 2 to 4 and need not be an integer. Such compounds are substantially alcohol insoluble and require the addition of water or other water-containing solvents to obtain a soluble state.

Recent attempts to improve the alcohol solubility of basic aluminum chloride solids have led to the development of alcohol soluble basic aluminum chlorides which are made by carefully controlling the molar ratio of aluminum to chloride and the amount of free and coordinated water present in the solid. Examples of two-thirds to five-sixths basic aluminum chloride solids having a calculated weight percent of free and coordinated water of about 18 to about 20, which are suitable for use in the antimicrobial compositions of this invention, are disclosed in copending application Ser. No. 84,093 for "Alcohol Soluble Basic Aluminum Chlorides and Method of Making Same", filed Oct. 26, 1970 by John L. Jones and Andrew M. Rubino and assigned to the same assignee as the assignee of the present invention.

ALCOHOLATED BASIC ALUMINUM HALIDE COMPLEXES

Numerous inorganic-organic coordinated complexes of aluminum where the ligand-Q in the above general formula is a hydrated or non-hydrated alcohol or glycol-ether have been described in the patent literature. Such compounds which are suitable for use in antimicrobial composition of the present invention include the alcohol soluble complexes produced by reacting organic hydroxylic compounds with basic aluminum salt as disclosed in U.S. Pat. No. 3,420,932 for "Methods of Making Alcohol Soluble Complexes of Aluminum and Preparations Employing the Complexes", issued to John L. Jones and Andrew M. Rubino; U.S. Pat. No. 3,359,169 for "Aluminum Compounds" issued to Joseph N. Slater, Jr.; U.S. Pat. No. 3,520,911 for "Method of Making Alcohol-Soluble Complexes of Aluminum" issued to John L. Jones and Andrew M. Rubino; and U.S. Pat. No. 3,523,130 for "Method of Making Alcohol-Soluble Complexes of Aluminum", issued to John L. Jones and Andrew M. Rubino. Such compounds can be represented as:

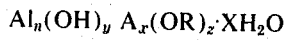

where $n$, $x$, $y$ and $z$ are integers such that $x + y + z = 3n$, R is an alkyl group, A is chloride, bromide or iodide or a mixture of these, and X may be zero to several weight percent of the total compound.

An example of such coordinated complexes of aluminum is the aluminum chlorohydroxide-propylene glycol complex sold under the trademark REHYDROL ASC by the Reheis Chemical Company, Division of Armour Pharmaceutical Company. The solid contains about 75% by weight of aluminum chlorohydroxide having an aluminum to chloride ratio of 2 to 1, and may be considered to be a poly nuclear (Werner type) coordination complex of basic aluminum chloride and propylene glycol in which the water molecules normally coordinated to aluminum in the chlorohydroxide have been displaced by the alcoholic oxygens of the glycol resulting in a relatively less polar complex of low water content.

Substantially anhydrous, i.e. a water content of less than about 2 percent by weight, basic aluminum halide complexes which are alcoholated with an aliphatic alcohol having from 1–4 carbon atoms are disclosed in copending application Ser. No. 84,172 for "Alcoholated Basic Aluminum Halide Compounds and Methods of Making Same" filed on Oct. 26, 1970 by the present inventors. Such compounds are represented by the general formula:

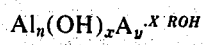

wherein $x$, $y$ and $n$ are integers such that $x + y = 3n$; ROH is at least one aliphatic alcohol, X is a number such that the total amount of free and coordinated alcohol in the complex is about 10 to 40 weight percent of the complex; and A is chlorine, bromine, iodine or a mixture thereof.

Preferably, the coordinated complex of aluminum is an aluminum chlorohydroxy complex corresponding to the formula:

in which X is a halide selected from the group consisting of chlorine, bromine and iodine and mixtures thereof, and $n$ is from 1 to 5. Most preferred is the basic aluminum chloride having the approximate formulation $Al_2(OH)_5Cl$ with the atomic ratio of aluminum to chloride being between 1.9 and 2.1 to 1.

Suitable halogenated bisphenols for use in preparing an antimicrobial composition according to the present invention are unalkylated or alkylated polyhalobisphenols which can be represented according to their chemical structure as follows:

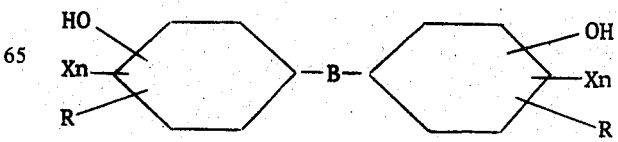

wherein X represents a halogen and need not correspond to the halogen on the basic aluminum salt, $n$ represents an integer from 1 to 3, and B represents a divalent radical including alkylene radicals and halo-substituted alkylene radicals having from 1 to 4 carbon atoms, or a functional group including sulfur; and R in the case of alkylated polyhalobisphenols is an alkyl group having from 1 to 4 carbon atoms.

The preferred compounds are symmetrical in structural configuration. Specific examples of the unalkylated polyhalobisphenols include 2,2'-dihydroxy-3,5,6,3',5',6'-hexachlorodiphenyl methane, 2,2'-dihydroxy-3,5,3',5'-tetrachlorodiphenyl methane, 2,2'-dihydroxy-4,5,4',5'-tetrachlorodiphenyl methane, 2,2'-dihydroxy-3,4,3',4'-tetrachlorodiphenyl methane, 2,2'-dihydroxy-5,5'-dibromodiphenyl methane, 2,2'-dihydroxy-3,5,3',5'-tetrachlorodiphenyl sulfide, and 2,2'-dihydroxy-5,5'-dichlorodiphenyl sulfide Specific examples of the alkylated halogenated bisphenols include 2,2'-dihydroxy-3,3'-dimethyl-5,5'-dichlorodiphenyl sulfide, 2,2'-dihydroxy-3,3'-dimethyl-5,5'-dichlorodiphenyl-trichloroethane, 2,2'-methylene-bis(4-chloro-6-isopropylphenol), 2,2'-methylene-bis(6-sec-butyl-4-chlorophenol), 2,2'-ethylidene-bis(4-chloro-6-isopropylphenol), 2',2-ethylidene-bis(6-sec-butyl-4-chlorophenol), 2,2'-isopropylidene-bis(4-chloro-6-isopropylphenol), and 2,2'-isopropylidene-bis(6-sec-butyl-4-chlorophenol).

A preferred polyhalobisphenol in accordance with the present invention is 2,2'-dihydroxy-3,5,6,3',5',6'-hexachlorodiphenyl methane, commonly referred to as hexachlorophene.

2,4,4'-trichloro-2'-hydroxy bisphenyl ether which can be utilized in place of the halogenated bisphenol is sold under the trademark IRGASAN DP300 by Geigy Chemical Corporation.

The third constituent of the antimicrobial composition of the present invention is a polyhalocarbanilide of which the preferred composition is identified as 3,4,4'-trichlorocarbanilide (TCC) or its position isomer 3,3',4-trichlorocarbanilide, each of which can be identified by the following structural formula:

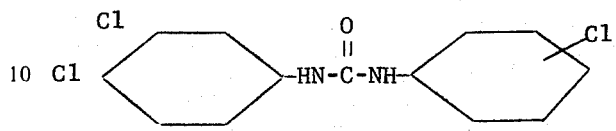

EXAMPLE I

Antimicrobial compositions exemplary of the present invention are prepared by intimately mixing the constituents listed in Table I below, to produce a synergistic admixture by simple dry blending of the three components.

TABLE I

| No. | 5/6 Basic Aluminum Chloride | Hexachlorophene | 3,4,4'-trichloro-carbanilide | 2,4,4'-trichloro-2'-hydroxy-diphenyl ether |
|---|---|---|---|---|
| 1 | 99.5 | 0.25 | 0.25 | — |
| 2 | 99.5 | — | 0.25 | 0.25 |
| 3 | 98 | 1 | 1 | — |
| 4 | 98 | — | 1 | 1 |
| 5 | 90 | 5 | 5 | — |
| 6 | 90 | — | 5 | 5 |
| 7 | 85 | 10 | 5 | — |
| 8 | 85 | 5 | 10 | — |
| 9 | 85 | — | 10 | 5 |
| 10 | 85 | — | 5 | 10 |
| 11 | 80 | 10 | 10 | — |
| 12 | 80 | — | 10 | 10 |
| 13 | 89 | 10 | 1 | — |
| 14 | 75 | 15 | 10 | — |
| 15 | 70 | 10 | 20 | — |
| 16 | 70 | — | 20 | 10 |
| 17 | 70 | 20 | 10 | — |
| 18 | 70 | — | 10 | 20 |

Advantageously, the production of the tri-component system can be carried out by co-dissolution of the components in some mutual solvent such as anhydrous ethanol which may be denatured, and then removing the solvent using either vacuum or heat or vacuum and heat in combination. Alternatively, the dry product can be recovered by spray drying or freeze drying utilizing conventional drying apparatus. Concentration adjustments of the respective solutes are maintained in the finished product in the same ratios or proportions as added. When dried from solution, such antimicrobial compositions are more homogeneous than those produced by simple dry blending and in addition, exhibit greater antimicrobial activity. It is believed that a newly developed chemical or physical bond may account for this increase in activity when dried from alcohol solution.

A specific example of one particular composition dried from an alcoholic solution is described by the following example. A 300 gram sample of spray dried 5/6 basic aluminum chloride described in copending application Ser. No. 84,093 for "Alcohol Soluble Basic Aluminum Chlorides and Method of Making Same" filed Oct. 26, 1970, by John L. Jones and Andrew M. Rubino, assaying approximately 25.0 percent aluminum, 17.0 percent chloride, and 19.0 percent water was dissolved in 700 grams of ethyl alcohol (SDA-40). To this alcoholic solution was added with constant agitation 3 grams of hexachlorophene and 3 grams of trichlorocarbanilide. The resulting clear solution was evaporated at 10–15 mm Hg pressure and at 35°C. to near constant weight to yield 300 grams of product. The homogeneity of the product was verified by separately analyzing various aliquots of the product. The product contained 24 percent aluminum, 16 percent chloride, 19 percent water, 1 percent hexachlorophene and 1 percent trichlorocarbanilide.

The utility of the present invention has been demonstrated by comparing the antimicrobial activity of the synergistic combinations with the activity of the individual constituents or parent compounds of the system. These tests were carried out using standard broth dilution techniques employing either nutrient broth or nutrient agar. The procedure employed in the tube dilution method to determine the minimum inhibition concentration for a complete inhibition of test organisms (bacteria and fungi) by the antimicrobial test sample may be broadly outlined as follows:

1. Test sample preparation
2. Test sample addition to nutrient broth
3. Incubation of system
4. Final observation of M.I.C.

The test samples are initially ball-milled to a particle size of about 5 microns. The ground sample is then dispersed in sterilized, distilled water obtaining a homogeneous slurry. The test slurry is then added to nutrient broth previously inoculated with a specific concentration of test organism. The sample-broth system is then incubated at 35°C for at least 24–30 hours for bacteria (for fungi, incubation is conducted at room temperature for approximately 3 days), and then observations are made for indications of microbial life. The minimum concentration of test sample necessary for complete inhibition of the organism represents the reported M.I.C.

Data for various representative bacteria and fungi are given below in Table II. Results for simple admixture are so labeled. The unlabeled systems represent those dried from solution using anhydrous denatured ethanol. The variance in relative antimicrobial activity per given sample per organism may be accountable by the change in virility or changes in the organisms employed in the study as a function of time. Also precision varies with the operator's skill and technique. The table depicts minimum concentrations of antimicrobial agent for a complete inhibition using organisms which were all readily available (ATCC) culture types.

TABLE II

| | Minimum Inhibition Concentration in ppm | | | | | | | |
|---|---|---|---|---|---|---|---|---|
| | BACTERIA | | | | | FUNGI | | |
| COMPOUNDS & PARENTS | E. COLI | PS. AERU-GINOSA | PROT. VULGARIS | STAPH. AUREUS | STAPH. EPI-DER-MIDIS | C. ALBICANS | P. OVALE | TR. MENTA-GRO-PHYTES |
| 5/6 Basic Aluminum Chloride | 6,000 | 1,500 | — | 6,000 | — | >2,000 | >2,000 | >2,000 |
| 5/6 Basic Aluminum Chloride | >10,000 | >10,000 | >10,000 | 10,000 | 10,000 | 10,000 | 10,000 | 10,000 |
| 5/6 Basic Aluminum Bromide | >2,000 | >2,000 | — | >2,000 | — | >2,000 | >2,000 | >2,000 |
| 5/6 Basic Aluminum Iodide | 700 | 900 | 500 | 100 | 100 | >1,000 | >1,000 | >1,000 |
| Hexachlorophene | 80 | >1,000 | >800 | 6 | 5 | >1,000 | >1,000 | >1,000 |
| Hexachlorophene | 100 | 10,000 | 1,000 | 100–10 | 100 | >10,000 | 1,000 | 1,000 |
| Hexachlorophene | >1,000 | 400 | 10 | 1 | 1 | 200 | 1,500 | 1,000 |
| 3,4,4'-Trichlorocarbanilide | >2,000 | >2,000 | — | 100 | — | >2,000 | ~600 | >2,000 |
| TCC | 10 | >10,000 | >10,000 | 10 | 10 | >10,000 | >10,000 | >10,000 |
| TCC | >1,000 | >10,000 | >800 | 100 | 100 | >1,000 | >1,000 | 1,000 |
| TCC | >2,000 | >2,000 | >2,000 | 6 | 0.2 | >1,000 | >1,000 | 50 |
| 1 5/6 Basic Aluminum Chloride 10% TCC-10% Hexachlorophene | 800 | 70 | 20 | 1 | 1 | 20 | 10 | 60 |
| 2 5/6 Basic Aluminum Chloride 5% TCC-5% Hexachlorophene | 200 | 50 | 5 | 1 | 1 | 10 | 20 | 100 |
| 3 5/6 Basic Aluminum Chloride 10% TCC-20% Hexachlorophene | 100 | 40 | 15 | 1 | 1 | 20 | 20 | 500 |
| 4 5/6 Basic Aluminum Chloride 20% TCC-10% Hexachlorophene | 120 | 40 | 15 | 1 | 1 | 30 | 30 | 80 |
| 5 5/6 Basic Aluminum Chloride 1% TCC-10% Hexachlorophene | 300 | 60 | 15 | 1 | 1 | 30 | 40 | 80 |
| 6 5/6 Basic Aluminum Chloride 1% TCC-1% Hexachlorophene | ~1,000 | 500 | 550 | 3 | 3 | >1,000 | 90 | 100 |
| 7 5/6 Basic Aluminum Chloride 1% TCC-1% Hexachlorophene | >1,000 | 300 | 400 | 50 | 30 | 120 | 80 | 120 |
| 8 5/6 Basic Aluminum Chloride 1% TCC-1% Hexachlorophene (spray dried from Alc.) | 1,000 | 500 | 300 | 1 | 2 | 800 | 40 | >1,000 |
| 9 5/6 Basic Aluminum Bromide 1% TCC-1% Hexachlorophene | ~1,000 | 400 | 800 | 3 | 3 | 800 | 90 | 90 |
| 10 5/6 Basic Aluminum Iodide 1% TCC-1% Hexachlorophene | >1,000 | 500 | 800 | 2 | 2 | 500 | 90 | 120 |
| 11 5/6 Basic Aluminum Chloride 10% TCC-10% Hexachlorophene (admixture) | 900 | 600 | 700 | 1 | 1 | 2 | 2 | 2 |
| 12 5/6 Basic Aluminum Chloride 1% TCC-1% Hexachlorophene (admixture) | 900 | 500 | 600 | 2 | 2 | >1,000 | 90 | 120 |
| 13 5/6 Basic Aluminum Chloride 1% TCC-1% Hexachlorophene (admixture) | >1,000 | 500 | 600 | 40 | 30 | 500 | 100 | 160 |
| 14 5/6 Basic Aluminum Chloride 1% TCC-1% Hexachlorophene (admixture) | 1,000 | 800 | 800 | 1 | 1 | ~1,000 | ~400 | ~800 |
| 15 5/6 Basic Aluminum Chloride 1% TCC-1% Hexachlorophene (admixture) | 500 | 900 | 20 | 1 | 1 | ~1,000 | 30 | 100 |

As may be readily seen from a consideration of the results set forth in Table II above, the advantages of the novel tri-component composition are numerous. Such compositions exhibit broad spectrum antimicrobial activity against both Gram-negative and Gram-positive bacteria as well as against resident skin bacteria, dermatophytes, yeasts and various fungi. In addition, because of the low concentration of the halogenated bisphenol in the present antimicrobial compositions, the inherent limitations associated with the use of bisphenols such as hexachlorophene are reduced substantially. Moreover, since the basic aluminum halide constitutes at least 70 weight percent of the tri-component system, the inherent astringent and healing characteristics associated with such aluminum salts enhances the topical usage of the new composition. Thus, the present invention provides topically employable ingredients for creams, lotions, ointments, powders and the like where germicidal activity is required along with astringency and healing characteristics.

Results of tests with additional organisms run against an antimicrobial composition consisting essentially of 98 percent by weight of $Al_2(OH)_5Cl \cdot x H_2O$, 1 percent by weight of trichlorocarbanilide (TCC) and 1 percent by weight of hexachlorophene (G-11) are presented in Table III.

TABLE III

| Presque Isle No. | Organism | MIC in ppm |
|---|---|---|
| 341 | Aerobacter aerogenes | 1,000 |
| 339 | E. freundii | 250 |
| 347 | Paracolobactrum intermedium | 900 |
| 370 | Salmonella cholerasuis | 120 |
| 620 | B. subtiles 3 | |
| 470 | Sarcina lutea ** | 10 |
| 585 | Corynebacterium xerosis ** | 60 |
| 465 | Staph. albus | 1 |
| 512 | Strep. pyogenes ** | 5 |
| | Fungi | |
| PI No. 922 | Aspergillus niger | 150 |
| F-62 (Ortho) | Microsporum audouinii | 60 |
| ATCC 16022 | Cladosporum herbarum | 50 |

** Heart infusion medium

Additional results illustrating the broad spectrum activity against both bacteria and fungi of the synergistic combination consisting essentially of in the range of from 70 to 99.5 percent by weight of a basic aluminum halide, in the range of from 0.25 to 20 percent by weight of 2,4,4'-trichloro-2'-hydroxydiphenyl ether (IRGASAN DP300) and in the range of from 0.25 to 20 percent by weight of trichlorocarbanilide (TCC), are set forth in Table IV.

TABLE IV

| | Minimum Inhibition Concentration in ppm | | | | | | | |
|---|---|---|---|---|---|---|---|---|
| | BACTERIA | | | | | FUNGI | | |
| COMPOUNDS & PARENTS | E. COLI | PS. AERUGINOSA | PROT. VULGARIS | STAPH. AUREUS | STAPH. EPIDERMIDIS | C. ALBICANS | P. OVALE | TR. MENTAGROPHYTES |
| Irgasan DP300 or 2,4,4'-trichloro-2'-hydroxy-diphenyl ether | 0.1 | >2,000 | — | 0.05 | — | >200 | >200 | >200 |
| Ditto | 300 | ~1,000 | ~1,000 | 2 | 2 | 500 | 800 | 800 |
| Polyhalocarbanilide (TCC) | >2,000 | >2,000 | >2,000 | 10–1 | 10–1 | >1,000 | >1,000 | 10–1 |
| $AlCl_3 \cdot 6H_2O$ | 500 | 320 | 180 | >100 | >100 | ~1,000 | >1,000 | >1,000 |
| ⅓ Basic Aluminum Chloride | 500 | 500 | 700 | >100 | >100 | 800 | >1,000 | >1,000 |
| ⅔ Basic Aluminum Chloride | 500 | 800 | 700 | 80 | >100 | 900 | >1,000 | ~1,000 |
| Aluminum Chlorhydroxide | >2,000 | 1,500 | — | >2,000 | — | >2,000 | >2,000 | >2,000 |
| Aluminum Chlorhydroxide (freeze dried) | >1,000 | ~1,000 | ~800 | 80 | ~100 | 600 | >1,000 | >1,000 |
| 1  98% ⅓ Basic Aluminum Chloride, 1% Irgasan DP300, 1% TCC | 400 | 400 | 50 | 1 | 2 | >1,000 | >1,000 | ~1,000 |
| 2  98% ⅔ Basic Aluminum Chloride, 1% Irgasan DP300, 1% TCC | 400 | 500 | 20 | 1 | 2 | 900 | 900 | 700 |
| 3  98% Aluminum Chloride, 1% Irgasan DP300, 1% TCC | 500 | 320 | 30 | 2 | 6 | 900 | 900 | 700 |
| 4  98% Aluminum Chlorhydroxide, 1.33% Irgasan DP300, 0.67% TCC | 100 | >1,000 | 180 | 0.2 | 0.2 | 200 | 450 | >1,000 |
| 5  99% Aluminum Chlorhydroxide, 0.5% Irgasan DP300, 0.5% TCC | 70 | 650 | 15 | 0.2 | 1 | 600 | 600 | >1,000 |
| 6  99.5% Aluminum Chlorhydroxide, 0.25% Irgasan DP300, 0.25% TCC | 300 | 15 | >1,000 | 1 | 1 | ~800 | 900 | 900 |
| 7  98% Aluminum Chlorhydroxide, 1% Irgasan DP300, 1% TCC | 300 | 320 | 320 | 1 | 1 | 700 | 120 | 40 |
| 8  98% Aluminum Chlorhydroxide, 1% Irgasan DP300, 1% TCC | 300 | 550 | 320 | 6 | 5 | ~1,000 | 280 | ~1,000 |
| 9  98% Freeze Dried Aluminum Chlorhydroxide, 1% Irgasan DP300, 1% TCC | 800 | 800 | 20 | 1 | 2 | 400 | 500 | 700 |
| 10  80% Aluminum Chlorhydroxide, 10% Irgasan DP300, 10% TCC | 150 | 750 | ~1,000 | 10 | 8 | >1,000 | 800 | ~1,000 |
| 11  70% Aluminum Chlorhydroxide, 10% Irgasan DP300, 20% TCC | 40 | 500 | 450 | 10 | 10 | 500 | >1,000 | >1,000 |
| 12  70% Aluminum Chlorhydroxode, 20% Irgasan DP300, 10% TCC | 250 | 500 | 650 | 6 | 6 | 900 | 450 | 750 |
| 13  98% 5/6 Basic Aluminum Bromide, 1% Irgasan DP300, 1% TCC | 20 | >1,000 | 10 | 1 | 1 | 600 | 500 | >1,000 |
| 14  98% 5/6 Basic Aluminum Iodide, 1% Irgasan DP300, 1% TCC | 40 | >1,000 | 30 | 4 | 20 | 600 | 320 | 500 |
| 15  98% Aluminum Chlorhydroxide, 1% Irgasan DP300, 1% TCC (admixture) | 10 | >1,000 | 30 | 1 | 1 | 500 | 300 | 320 |
| 16  98% Aluminum Chlorhydroxide, 1% Irgasan DP300, 1% TCC (admixture) | 10 | 900 | 20 | 1 | 1 | 300 | 180 | 240 |

Additional results, illustrating synergistic activity with various basic aluminum chlorides combined with hexachlorophene (G-11) and trichlorocarbanilide (TCC) are shown in Table V.

TABLE V

| COMPOUNDS & PARENTS | Minimum Inhibition Concentration in ppm | | | | | | | |
|---|---|---|---|---|---|---|---|---|
| | BACTERIA | | | | | FUNGI | | |
| | E. COLI | PS. AERU- GINOSA | PROT. VULGARIS | STAPH. AUREUS | STAPH. EPIDER- MIDIS | C. ALBICANS | P. OVALE | TR. MENTA- GRO- PHYTES |
| 1  98% Aluminum Chloride, 1% G-11, 1% TCC | 320 | 90 | 100 | 2 | 2 | 10 | 90 | 600 |
| 2  98% ⅓ Basic Aluminum Chloride, 1% G-11, 1% TCC | 1,000 | 150 | 150 | 2 | 2 | 1,000 | 280 | 280 |
| 3  98% ⅔ Basic Aluminum Chloride, 1% G-11, 1% TCC | 900 | 150 | 300 | 2 | 2 | 800 | 100 | 100 |
| 4  99% 5/6 Basic Aluminum Chloride, 0.5% G-11, 0.5% TCC | 160 | 120 | 800 | 2 | 2 | 120 | 35 | 90 |
| 5  99.5% 5/6 Basic Aluminum Chloride, 0.25% G-11, 0.25% TCC | 750 | 90 | 800 | 5 | 4 | 320 | 60 | 500 |

What is claimed is:

1. An antimicrobial composition consisting essentially of
   i. from 70 to 99.5 percent by weight of an aluminum halide compound which can be represented by the formula:

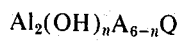
   $$Al_2(OH)_nA_{6-n}Q$$

where $n$ is 0–5, where A is chlorine, bromine, iodine or a mixture thereof, and Q is selected from the group consisting of water a polyhydroxy compound having at least two carbon atoms each of which is linked to a hydroxy group and mixtures of water and said compound, and where the total amount of free and coordinated constituent Q is in the range of from about 15 to 40 percent by weight of the total weight of the basic aluminum halide compound,
   ii. from 0.25 to 20 percent by weight of a bactericidal agent selected from the group consisting of halogenated bisphenols and 2,4,4'-trichloro-2'-hydroxydiphenyl ether, and
   iii. from 0.25 to 20 percent by weight of 3,4,4'-trichlorocarbanilide or 3,3',4-trichlorocarbanilide.

2. An antimicrobial composition containing as its essential active ingredients a synergistic combination of (1) 70–99.5 weight percent of a basic aluminum halide compound of the formula $Al_2(OH)_nX_{6-n}Q$, where X is a halide selected from the group consisting of chlorine, bromine and iodine and mixtures thereof, and n is from 1 to 5, and Q is selected from the group consisting of water, a polyhydroxy compound having at least two carbon atoms each of which is linked to a hydroxy group and mixtures of water and said compound, (2) 0.25–20 weight percent of a bactericidal agent selected from the group consisting of polyhalobisphenols and 2,4,4'-trichloro-2'-hydroxydiphenyl ether and (3) 0.25–20 weight percent of 3,4,4'-trichlorocarbanilide or 3,3',4-trichlorocarbanilide.

3. An antimicrobial composition consisting essentially of
   i. from 70 to 99.5 percent by weight of a basic aluminum halide compound of the formula $Al_2(OH)_nX_{6-n}Q$, where X is chlorine, bromine, iodine or a mixture thereof, and $n$ is from 1 to 5, and Q is selected from the group consisting of water, a polyhydroxy compound having at least two carbon atoms each of which is linked to a hydroxy group and mixtures of water and said compound,
   ii. from 0.25 to 20 percent by weight of hexachlorophene, and,
   iii. from 0.25 to 20 percent by weight of 3,4,4'-trichlorocarbanilide or 3,3',4-trichlorocarbanilide.

4. The composition of claim 3, wherein said basic aluminum halide compound is five-sixths basic aluminum chloride.

5. The composition of claim 3, wherein said basic aluminum halide compound is five-sixths basic aluminum bromide.

6. The composition of claim 3, wherein said basic aluminum halide compound is five-sixths basic aluminum iodide.

7. The composition of claim 3, wherein said basic aluminum halide compound is one-third basic aluminum chloride.

8. The composition of claim 3, wherein said basic aluminum halide compound is two-thirds basic aluminum chloride.

9. The composition of claim 3, wherein said inorganic moiety is aluminum chloride.

10. An antimicrobial composition consisting essentially of
    i. from 70 to 99.5 percent by weight of a basic aluminum halide compound of the formula $Al_2(OH)_nX_{6-n}Q$, where X is chlorine, bromine, iodine or a mixture thereof, $n$ is from 1 to 5, and where Q is selected from the group consisting of water, a polyhydroxy compound having at least two carbon atoms each of which is linked to a hydroxy group and mixtures of water and said compound,
    ii. from 0.25 to 20 percent by weight of 2,4,4'-trichloro-2'-hydroxydiphenyl ether, and
    iii. from 0.25 to 20 percent by weight of 3,4,4'-trichlorocarbanilide or 3,3',4-trichlorocarbanilide.

11. The composition of claim 10, wherein said basic aluminum halide compound is five-sixths basic aluminum chloride.

12. The composition of claim 10, wherein said basic aluminum halide compound is basic aluminum bromide.

13. The composition of claim 10, wherein said basic aluminum halide compound is basic aluminum iodide.

14. The composition of claim 10, wherein said basic aluminum halide compound is one-third basic aluminum chloride.

15. The composition of claim 10, wherein said basic aluminum halide compound is two-thirds basic aluminum chloride.

16. The composition of claim 10, wherein said inorganic moiety is aluminum chloride.

* * * * *